United States Patent [19]

Nordstrom et al.

[11] 4,203,678
[45] May 20, 1980

[54] ELECTRONIC CONTROL CIRCUIT FOR A HIGH SPEED BIDIRECTIONAL PRINTER

[75] Inventors: Larry A. Nordstrom, Oviedo; Daniel J. Szechy, Sanford, both of Fla.

[73] Assignee: Scope Data Incorporated, Orlando, Fla.

[21] Appl. No.: 934,423

[22] Filed: Aug. 17, 1978

[51] Int. Cl.² .................. B41J 19/30; G05B 19/40
[52] U.S. Cl. ........................ 400/320; 400/322; 400/328; 400/903; 318/685; 400/323
[58] Field of Search .................. 101/93.05; 400/119, 400/120, 121, 124, 320, 322, 323, 328, 902, 903; 318/685

[56] References Cited

U.S. PATENT DOCUMENTS

| | | | |
|---|---|---|---|
| 3,764,994 | 10/1973 | Brooks et al. | 400/124 X |
| 3,789,971 | 2/1974 | Deyesso et al. | 318/685 X |
| 3,891,077 | 6/1975 | Sauerbrunn | 400/124 |
| 3,941,051 | 3/1976 | Barrus et al. | 400/121 X |
| 3,942,619 | 3/1976 | Nordstrom et al. | 400/903 X |
| 3,950,685 | 4/1976 | Kramer | 400/124 |
| 3,967,271 | 6/1976 | Day | 340/347 P |
| 3,970,183 | 7/1976 | Robinson et al. | 400/323 X |
| 3,973,662 | 8/1976 | Fulton | 400/124 |
| 3,983,468 | 9/1976 | Maitrias | 318/685 |
| 4,024,447 | 5/1977 | Epstein | 400/320 X |
| 4,025,837 | 5/1977 | Meier et al. | 318/685 X |
| 4,037,705 | 7/1977 | Martin et al. | 400/124 |
| 4,058,195 | 11/1977 | Fravel et al. | 400/322 X |
| 4,072,888 | 2/1978 | Bechtle et al. | 318/685 |
| 4,074,067 | 2/1978 | Speckhard | 400/124 X |
| 4,114,750 | 9/1978 | Baeck et al. | 400/323 X |
| 4,118,129 | 10/1978 | Grundherr | 400/320 X |
| 4,125,336 | 11/1978 | Chu | 400/124 |
| 4,152,083 | 5/1979 | Kostoff | 400/328 X |
| 4,158,800 | 6/1979 | Jahelka et al. | 318/685 |

FOREIGN PATENT DOCUMENTS 1403629  8/1975  United Kingdom .................. 400/903

OTHER PUBLICATIONS

IBM Tech. Disc. Bulletin, R. A. McSparran, "Stepper Motor Reversal Circuit," vol. 20, No. 11B, Apr. 1978, pp. 4734-4736.

*Primary Examiner*—Paul T. Sewell
*Attorney, Agent, or Firm*—Duckworth, Hobby, Allen & Petti

[57] ABSTRACT

An electronic control circuit is designed for use with a high speed printer having a character generator which is coupled to a print head. The print head is laterally displaced along a print line by a stepper motor and forms characters from a plurality of columns of dots as the print head moves. The electronic control circuit includes an encoder which is coupled to the shaft of the stepper motor to generate count up pulses when the stepper motor displaces the print head in a first direction and count down pulses when the stepper motor displaces the print head in a second direction. The count up and count down pulses permit the control circuit to continuously define the present print head position. A random access memory receives printable characters during a load cycle and reads out printable characters to the character generator during a print cycle. A data formatting control is provided to format input data, to load the memory with the formatted data, to compute a desired print head position during each load cycle and to initiate the print mode at the end of each load mode. An up/down counter receives the count up and count down pulses and converts them into digital address signals for the memory and for the character generator to cause the print head to print selected characters at selected positions along the print line in response to displacements of the stepper motor. A motor control is provided to controllably accelerate and decelerate the print head during each print cycle.

29 Claims, 7 Drawing Figures

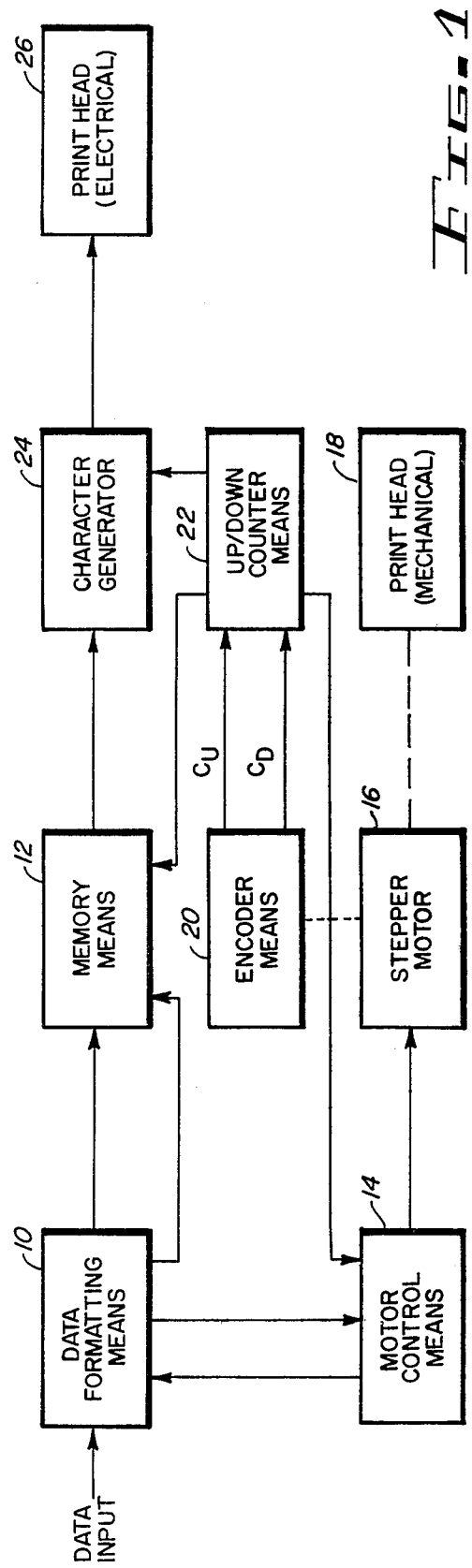
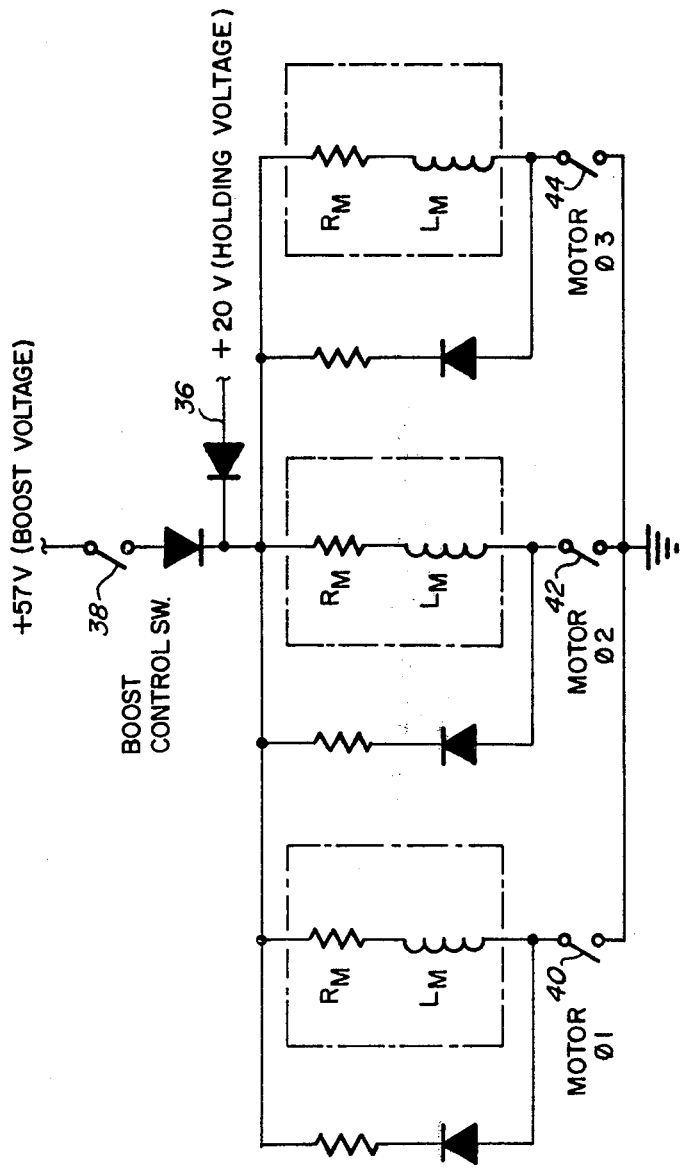

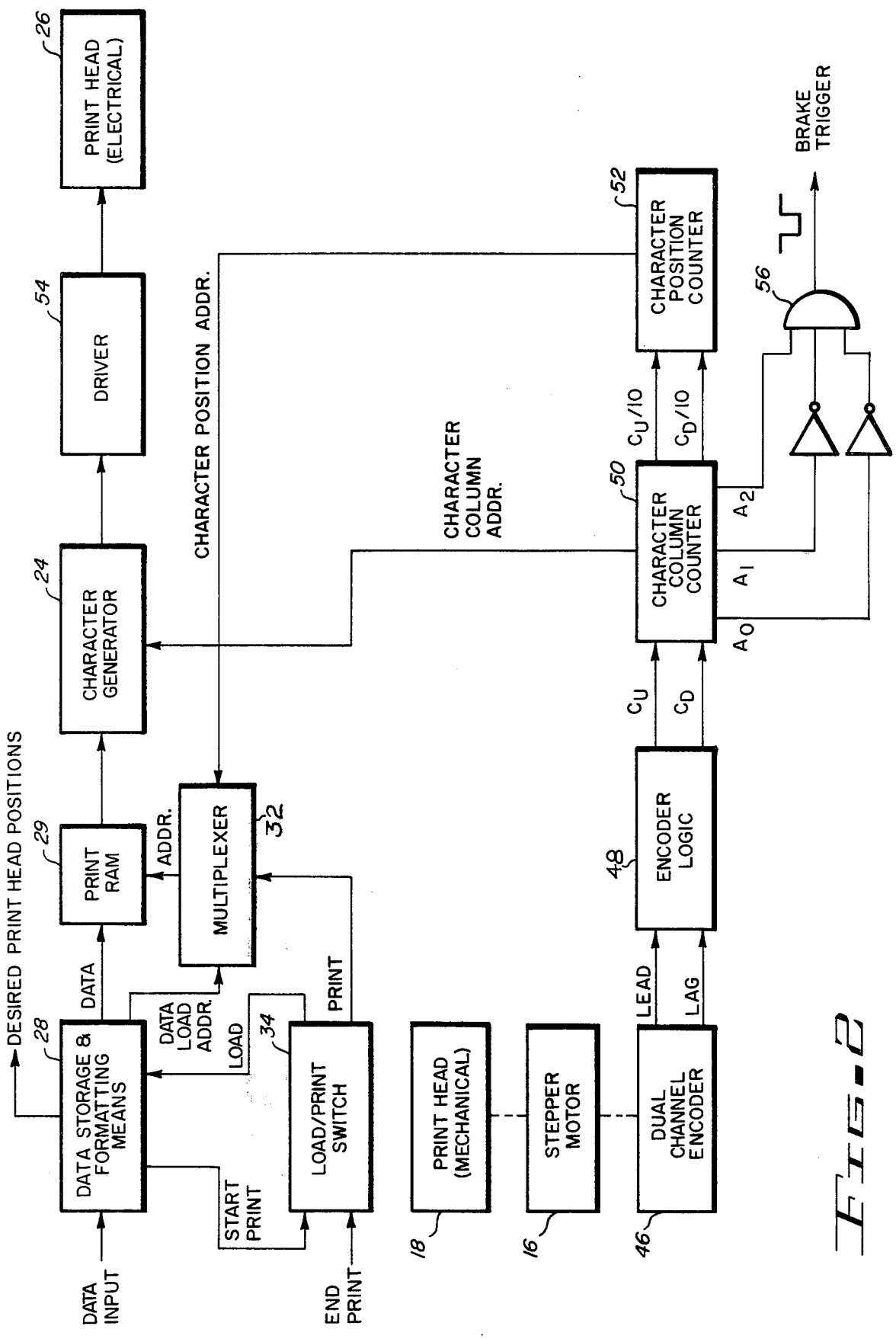

$C_U = A \cdot B \cdot \overline{B_D} + \overline{A} \cdot \overline{B} \cdot B_D$ $C_D = A \cdot \overline{B} \cdot B_D + \overline{A} \cdot B \cdot \overline{B_D}$

ELECTRONIC CONTROL CIRCUIT FOR A HIGH SPEED BIDIRECTIONAL PRINTER

BACKGROUND OF THE INVENTION

1. Field of the Invention

This invention relates to high speed printers which sequentially print characters in either a first or a second direction along a selected print line.

2. Description of the Prior Art

In order to print characters by means of a print head which is driven at high speeds laterally along a print line by a stepper motor, it is necessary to closely coordinate the generation of characters by the print head with the actual position of the print head along a selected print line. U.S. Pat. No. 3,942,619 to Nordstrom and Szechy, which is hereby incorporated by reference, discloses a high speed, single direction printer. This printer utilizes a voltage controlled oscillator to ramp up the stepper motor to maximum velocity in a minimum amount of time. The same voltage controlled oscillator is also used to indicate to the character generating circuitry the approximate print head position. A single electronic signal is thus used to energize the stepper motor and to simultaneously trigger the character generating circuitry.

U.S. Pat. No. 3,970,183 to Robinson discloses a random access line printer which includes an optically read registration strip in combination with count up and count down counters.

Other related disclosure is contained in the following United States Patents. U.S. Pat. Nos. 3,891,077 (Sauerbrunn); 3,824,587 (Fowler); 3,525,094, (Leonard); 3,432,847 (Eccles, et al); 3,408,484 (Stutz); 4,037,705 (Martin, et al.); 3,967,271 (Day); 3,973,662 (Fulton).

SUMMARY OF THE INVENTION

The present invention contemplates an electronic control circuit for a high speed printer having a character generator coupled to a print head which forms characters from a plurality of columns of dots as the print head is laterally displaced along a print line by a stepper motor. The control circuit comprises encoder means which is coupled to the stepper motor for generating count up pulses when the stepper motor displaces the print head in a first direction and count down pulses when the stepper motor displaces the print head in a second direction. The count up and count down pulses are used to continuously define the present print head position. Memory means is provided to receive printable characters during a load cycle and to read out printable characters to the character generator during a print cycle. Means is coupled to the memory means for formatting input data, computing a desired print head position during each load cycle and initiating the print mode at the end of each load cycle. Up/down counter means is coupled to the encoder means, to the memory means and to the character generator for converting the count up and count down pulses into digital address signals for the memory means and the character generator to cause the print head to print selected characters at selected positions along the print line. The characters to be printed are designated by the data formatting means in response to displacements of the print head by the stepper motor during each print cycle. Motor control means is coupled to the data formatting means and to the stepper motor to controllably accelerate the print head during each print cycle as a function of the difference between a desired print head position and the present print head position.

DESCRIPTION OF THE DRAWING

The invention is pointed out with particularity in the appended claims, however, other objects and advantages together with the operation of the invention may be better understood by reference to the following detailed description taken in connection with the following illustrations wherein:

FIG. 1 is a generalized block diagram of the electronic control circuit of the present invention.

FIGS. 2, 3 and 4 taken together represent a more detailed block diagram of the various elements of the present invention.

DESCRIPTION OF THE PREFERRED EMBODIMENT

Figure 3:
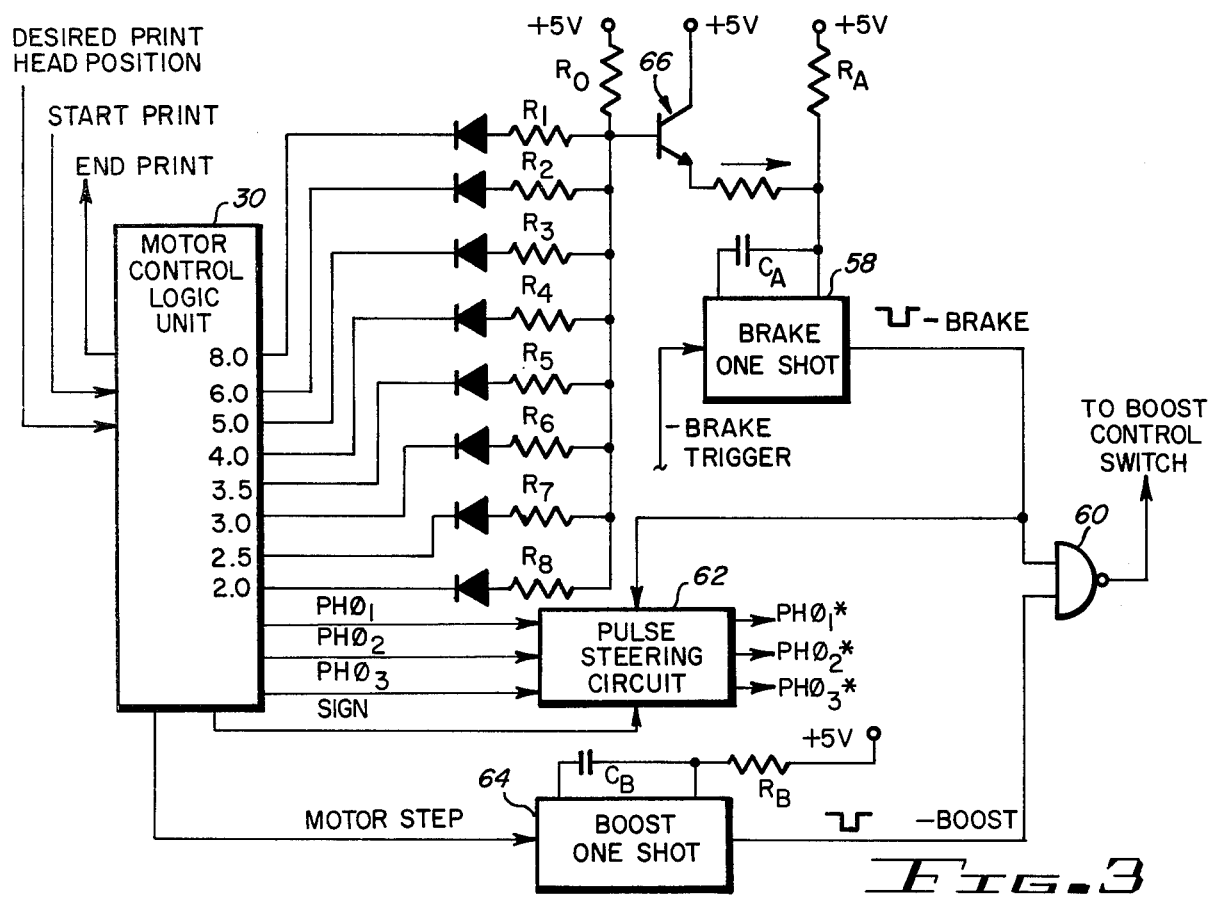

In order to better illustrate the advantages of the invention and its contribution to the art, a preferred hardware embodiment of the invention will now be described in some detail.

Referring now to FIG. 1, data formatting means 10 receives input data from an external source and arranges this data in a line by line format compatible with a printer which has an 80 character per line printing capacity. The electronic control circuit of the preferred embodiment incorporates two separate operating cycles. During the load cycle, data formatting means 10 loads memory means 12 with specially formatted data which corresponds to the characters which will be printed on a single line during a print cycle which occurs immediately subsequent to each load cycle.

Before commencing operation of the high speed printer which is controlled by the electronic control circuit of the present invention, the entire control circuit is initialized and the print head is positioned in a predetermined position such as the far left hand side of a print line. After data formatting means 10 receives and formats a single line of printable characters, it determines the desired print head position. Data formatting means 10 ascertains the initial print head position during the initialization step and from that point forward keeps a running measurement of the present print head position. A digital signal corresponding to the desired print head position is transmitted to motor control means 14. Memory means 12 is loaded with all data desired to be printed during a single translation of the print head from its present position to the desired position.

At the end of each load cycle, data formatting means 10 transmits a start print command to motor control means 14. The start print command commences operation of stepper motor 16 which mechanically translates a print head 18 back and forth across the page on which characters are to be printed.

Encoder means 20 is mechanically coupled to the shaft of stepper motor 16 and generates count up pulses when the shaft of stepper motor 16 is rotated to displace the print head to the right and count down pulses when the shaft of stepper motor 16 is rotated to displace the print head to the left. The count up and count down pulses generated by encoder means 20 continuously define the present print head position. Up/down counter means 22 converts the count up and count down pulses into digital address signals for memory means 12 and character generator 24 which further causes the electrical section of print head 26 to print selected characters at selected positions along the print line in accordance with the data format designated by data formatting means 10. As a result of the feedback path provided from the shaft of stepper motor 16 to encoder means 20 and up/down counter means 22, the printed characters generated by print head 26 are effectively directly coupled and synchronized with the position of the shaft of stepper motor 16 and hence with the physical position of the print head assembly 18.

Motor control means 14 controllably accelerates and decelerates the mechanical print head assembly 18 during each print cycle as a function of the difference between the desired print head position and the present print head position. Stepper motor 16 as a result of the control signals generated by motor control means 14 is electronically ramped up to maximum operating velocity in the shortest possible time while maintaining absolute control over the stepper motor itself.

Referring now to FIGS. 2 and 3, a more detailed discussion of the structure and operation of the electronic control circuit will be discussed. Data storage and formatting means 28 as well as other circuitry of the present invention is initialized before the entire control circuit commences operation. This initialization step defines the present position of the print head and permits data storage and formatting means 28 to ascertain the present print head position at all times thereafter. Since the electronic control circuitry of the present invention is able to print 80 characters per line in either a forward or reverse direction, data storage and formatting means 28 receives external data on its data input line and reformats that data in terms of 80 character lines and in terms of a particular print head displacement direction for each line. During each load cycle, a maximum of 80 characters is accepted and stored and the desired print head position is computed as a function of the present print head position and the number of characters to be printed on a selected line. A desired print head position signal is transmitted to motor control logic unit 30 before the next subsequent print cycle is commenced.

During each load cycle and upon completion of the data formatting step, print RAM 29 is loaded with this reformatted data while a data load address signal is simultaneously coupled from data storage and formatting means 28 through multiplexer 32 to print RAM 29. The character selected to be printed during the first motor step across a print line is stored in the first memory position of print RAM 29 while the character designated to be printed during the eightieth step across the print line is stored in the eightieth address of print RAM 29. A load/print switch (flip flop) 34 controls the operation of multiplexer 32 to direct the data load address from data storage and formatting means 28 to print RAM 29 during the load cycle. Upon completion of the load cycle, a start print signal is transmitted from data storage and formatting means 28 to load/print switch 34 which generates a print signal that is coupled to multiplexer 32. The start print signal is also transmitted to motor control logic unit 30 which causes the commencement of operation of stepper motor 16.

Figure 5:
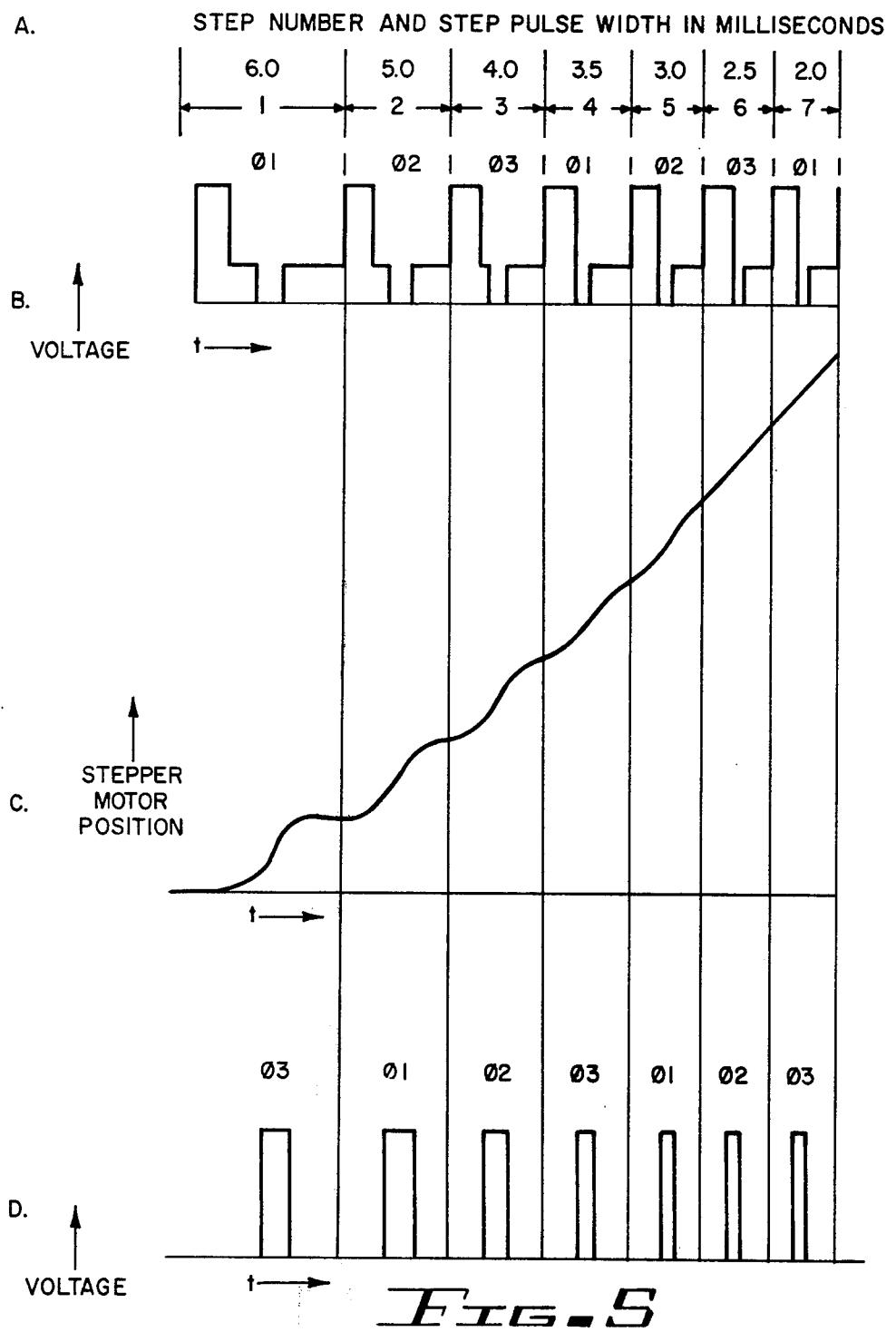
FIG. 5 illustrates timing diagrams of specific elements of the present invention.

Referring now to FIG. 5, waveforms B, C and D indicate the method used to accelerate stepper motor 16 from a standing start to maximum operating velocity. This timing diagram was explained in connected with the invention disclosed in U.S. Pat. No. 3,942,619.

Referring also now to FIG. 4, an electronic schematic diagram of a three phase stepper motor and its associated switching circuitry is illustrated. Electronic equivalent circuits are shown for the three motor windings and are enclosed within dotted blocks. The equivalent circuit of a stepper motor winding includes a coil having inductance $L_m$ and a resistance $R_m$. A resistor and a diode are coupled in parallel with each stepper motor winding to permit a more rapid elimination of the electromagnetic field sequentially created in each winding of the stepper motor. A 20 volt holding voltage is provided at point 36 while a 57 volt boost voltage is controllably applied to selected windings of the stepper motor by boost control switch 38. The control of the flow of current through motor phases $\phi 1$, $\phi 2$ and $\phi 3$ are controlled respectively by switches 40, 42 and 44.

FIG. 5A identifies by number the first seven steps and the pulse width of each step as stepper motor 16 accelerates from a resting position to a high position. FIG. 5B indicates the accelerating voltage levels applied during each step to the various motor phases. FIG. 5C indicates the shaft velocity of stepper motor 16 as it accelerates from a standing start. FIG. 5D illustrates the magnitude and timing of braking pulses which are applied to stepper motor windings one phase behind the winding being energized to accelerate the stepper motor to a higher velocity.

Referring now to FIGS. 4 and 5, during the first step of the series indicated in FIG. 5, the 57 volt boost voltage is applied first to motor phase 1 by closing boost control switch 38 and motor control switch 40. The pulse width of this boost control pulse is typically fixed at around 1.3 miliseconds for the stepper motor used in the preferred embodiment of the invention as this provides the maximum possible acceleration and saturates the motor inductor as the boost pulse terminates. At the end of the 1.3 milisecond boost pulse, switch 38 opens and a 20 volt holding voltage is provided by the voltage on line 36. In order to prevent the stepper motor shaft from overshooting the desired position and to maintain maximum control over the displacement of the stepper motor shaft, a retrotorque pulse is applied to motor phase winding $\phi 3$ as indicated in FIG. 5D by opening switch 40 and closing switch 44 for a predetermined amount of time. Upon termination of the retrotorque pulse, switch 44 is opened and switch 40 is once again closed. This procedure is repeated during each step of a stepper motor in order to ramp up the stepper motor to its maximum velocity in a minimum period of time while maintaining absolute control over the shaft position curve indicated in FIG. C. The method of modifying the total pulse width of each step and of controlling the pulse width of retrotorque voltage will be discussed below. The shaft velocity of stepper motor 16 is ramped down from its maximum velocity to zero in a manner just the reverse of that disclosed in connection with FIG. 5.

Figure 6:
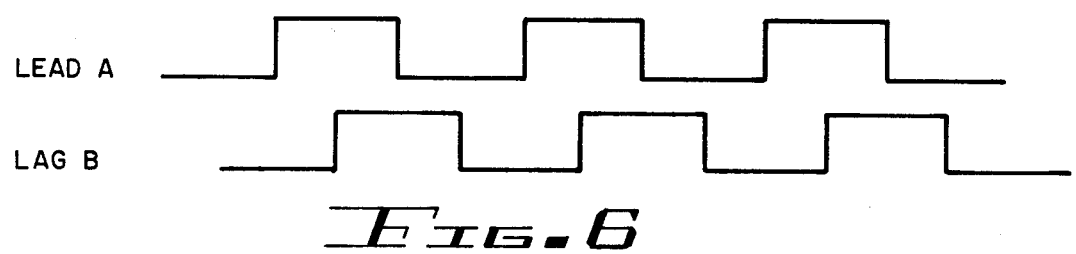
FIG. 6 is a graphical representation of the output pulses from the dual channel encoder of the present invention.

Referring now to FIGS. 2 and 6, a dual channel encoder 46 is coupled to the shaft of stepper motor 16. A commercially available dual channel encoder is used in the preferred embodiment of the present invention and includes two 120 aperture rows positioned around the periphery of the encoder wheel. The apertures are positioned so that they will generate the lead and lag waveforms shown in FIG. 6 where there is a relative ninety degree phase shift between the lead and lag waveforms. A dual channel encoder having two 240 aperture rows is also compatible with the preferred embodiment, but this particular type of hardware is substantially more expensive than an encoder having two peripherial rows of 120 apertures each.

Figure 7:
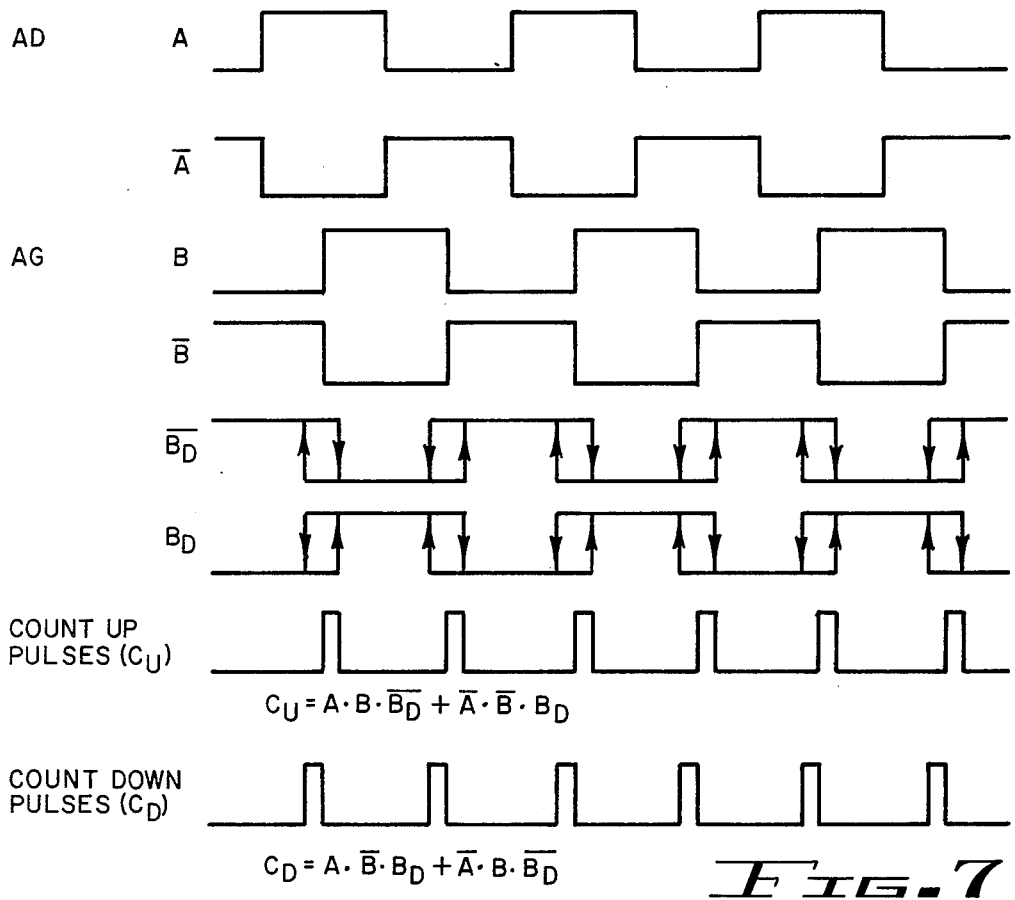
FIG. 7 discloses numerous timing diagrams which are combined to generate the count up and count down pulses produced by the encoder logic of the present invention.

The lead and lag output waveforms from dual channel encoder 46 are coupled to encoder logic 48. Encoder logic 48 operates on the lead signal (A) and on the lag signal (B) and incorporates an RC delay network to generate the count up (Cu) and count down (Cd) pulses as shown. The logic equations for the count up and count down pulses are those indicated by the equations in FIG. 7 directly below the respective waveforms.

The count up and count down pulses generated by encoder logic 48 are coupled to the input of a modulo 10 character column counter 50. Character column counter 50 and modulo 128 character position counter 52 form up/down counter means 22 which was discussed in connection with FIG. 1.

When the print head is positioned at the left hand margin of the printer, the output of character position counter 52 would be one indicating that the print head is located at the first character position along the print line. While in the print mode, the load/print switch 34 transmits a print command to multiplexer 32 which couples the output of character position counter 52 to the input of print RAM 29. The character position address signal from character position counter 52 is thus coupled to print RAM 29.

The character stored in the first address of print RAM 29 will be read out to character generator 24 as stepper motor 16 commences its initial step from the left hand margin of the print line during a print cycle beginning at that position. When the print head is positioned at the right hand margin of the print line, the output of character position counter 52 will be an 80 which will identify to print RAM 29 that the character stored in its eightieth storage position must be read out to character generator 24.

As stepper motor 16 begins to take its initial step from the left hand margin of the print line the count of modulo ten character column counter 50 will begin counting from a count of 9. During the first step, character column counter 50 will advance from a count of 9 to a count of 0 and will terminate with a count of 9 at the end of that step. Character column counter 50 generates a character column address signal which is coupled to an input of character generator 24 to cause printing to occur during binary counts 0001–0111. Printing is prevented from occurring on binary counts 000, 100 or 1001 in order to provide adequate spacing between adjacent characters. The count of character column counter 50 is incremented by either the count up pulses or the count down pulses received from encoder logic 48. The count up/count down pulses (10 per character) from encoder logic 48 insure that only a single character will be printed during a single step of stepper motor 16 and that the position of the character and the printing of the character will be precisely synchronized with the rotary displacement of the shaft of stepper motor 16. A driver circuit 54 is coupled to the output of character generator 24 to insure that a sufficient electrical drive signal is provided to the electrical portion of print head 26 to adequately form characters on the paper utilized in the printer.

Gate 56 is coupled to an additional output of character column counter 50 in order to generate a brake trigger pulse when counter 50 reaches a count 0100 which occurs approximately in the middle of a character. Each brake trigger pulse is coupled to the input of brake one shot 58 which immediately generates a braking pulse which is coupled through gate 60 to close boost control switch 38 and to the input of pulse steering circuit 62. The sequence of events caused by the triggering of a brake pulse and the method of altering the pulse width of the brake pulse will be discussed below.

During each load cycle, motor control logic unit 30 receives a desired print head position instruction from data storage and formatting means 28. Motor control logic unit 30 once initialized continuously maintains an accurate record of the present print head position. By combining the present print head position information and the desired print head position information during each load cycle, logic unit 30 is able to determine the direction and magnitude of the print head displacement required to reach the desired print head position.

While the control circuitry described in U.S. Pat. No. 3,942,619 utilized an analog voltage controlled oscillator to ramp up the stepper motor from a standing start to maximum velocity, motor control logic unit 30 stores a digital representation of the ramp up and ramp down functions required to ramp up stepper motor 16 to maximum velocity and to ramp down stepper motor 16 from maximum velocity to zero velocity. Table 1 below indicates the values stored in motor control logic unit 30 in order to obtain a 500 character per second print rate:

TABLE I (TIME IN MILLI-SECONDS)

| STEPS | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|
| 1 | 8.0 | | | | | | | | | | | | | | |
| 2 | 6.0 | 8.0 | | | | | | | | | | | | | |
| 3 | 6.0 | 5.0 | 8.0 | | | | | | | | | | | | |
| 4 | 6.0 | 5.0 | 5.0 | 8.0 | | | | | | | | | | | |
| 5 | 6.0 | 5.0 | 4.0 | 5.0 | 8.0 | | | | | | | | | | |
| 6 | 6.0 | 5.0 | 4.0 | 4.0 | 5.0 | 8.0 | | | | | | | | | |
| 7 | 6.0 | 5.0 | 4.0 | 3.5 | 4.0 | 5.0 | 8.0 | | | | | | | | |
| 8 | 6.0 | 5.0 | 4.0 | 3.5 | 3.5 | 4.0 | 5.0 | 8.0 | | | | | | | |
| 9 | 6.0 | 5.0 | 4.0 | 3.5 | 3.0 | 3.5 | 4.0 | 5.0 | 8.0 | | | | | | |
| 10 | 6.0 | 5.0 | 4.0 | 3.5 | 3.0 | 3.0 | 3.5 | 4.0 | 5.0 | 8.0 | | | | | |
| 11 | 6.0 | 5.0 | 4.0 | 3.5 | 3.0 | 2.5 | 3.0 | 3.5 | 4.0 | 5.0 | 8.0 | | | | |
| 12 | 6.0 | 5.0 | 4.0 | 3.5 | 3.0 | 2.5 | 2.5 | 3.0 | 3.5 | 4.0 | 5.0 | 8.0 | | | |
| 13 | 6.0 | 5.0 | 4.0 | 3.5 | 3.0 | 2.5 | 2.0 | 2.5 | 3.0 | 3.5 | 4.0 | 5.0 | 8.0 | | |
| 14 | 6.0 | 5.0 | 4.0 | 3.5 | 3.0 | 2.5 | 2.0 | 2.0 | 2.5 | 3.0 | 3.5 | 4.0 | 5.0 | 8.0 | |

TABLE I-continued

| (TIME IN MILLI-SECONDS) STEPS | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|
| 15 | 6.0 | 5.0 | 4.0 | 3.5 | 3.0 | 2.5 | 2.0 | 2.0 | 2.0 | 2.5 | 3.0 | 3.5 | 4.0 | 5.0 | 8.0 |

The values contained in Table 1 are designed to permit motor control means 14 to digitally control the ramp up/ramp down function of stepper motor 16. For simplicity of explanation, it will be assumed that phase 1 of stepper motor 16 will be the first phase energized as the motor is ramped up from a standing start. If motor control logic unit 30 determines that a displacement of five steps to the right has been commanded, it determines from its stored look up table that step pulse widths of 6.0, 5.0, 4.0, 5.0 and 8.0 milliseconds are required to ramp up and ramp down the stepper motor in order to complete the printing of five characters in the minimum possible time. Maximum stepper motor velocity will not be reached when only five steps are desired. Since in this example a print head displacement to the right is desired, motor control logic unit 30 will generate a positive sign output signal to indicate the rightward displacement. This displacement to the right will also sequentially activate motor phases $\phi1$, $\phi2$, $\phi3$, $\phi1$ and $\phi2$. For a print head displacement to the left a negative output sign would be generated by motor control logic unit 30 and stepper motor phases $\phi1$, $\phi3$, $\phi2$, $\phi1$ and $\phi3$ would be sequentially activated. As can be determined from Table I, stepper motor 16 does not reach the maximum velocity represented by a 2.0 millisecond pulse width per step until a minimum of a 13 step displacement has been commanded. For a 13 step displacement this maximum velocity is obtained only during a seventh step of stepper motor 16.

Motor control logic unit 30 sequentially generates timed outputs corresponding to the step pulse width desired for each selected motor phase on motor phase lines $PH\phi_1$, $PH\phi_2$ and $PH\phi_3$. Pulse steering circuit 62 receives these three stepper motor phase inputs and performs the following boolean expression:

$PH\phi1^* = SIGN[(PH\phi1\cdot\overline{BRAKE})+(PH\phi2\cdot BRAKE)] + \overline{SIGN}[(PH\phi1\cdot\overline{BRAKE})+(PH\phi3\cdot BRAKE)]$ $PH\phi2^* = SIGN[(PH\phi2\cdot\overline{BRAKE})+(PH\phi3\cdot BRAKE)] + \overline{SIGN}[(PH\phi2\cdot\overline{BRAKE})+(PH\phi1\cdot BRAKE)]$ $PH\phi3^* = SIGN[(PH\phi3\cdot\overline{BRAKE})+(PH\phi1\cdot BRAKE)] + \overline{SIGN}[(PH\phi3\cdot\overline{BRAKE})+(PH\phi2\cdot BRAKE)]$ Pulse steering circuit 62 insures that the braking pulses are applied to the proper motor phase. The sign input to pulse steering circuit 62 indicates whether the motor is rotating clockwise or counterclockwise. Outputs $PH\phi1^*$, $PH\phi2^*$ and $PH\phi3^*$ of pulse steering circuit 62 are directly coupled to motor phase switches 40, 42 and 44 which directly control the activation of the selected windings of stepper motor 16.

During the initial portion of each step, motor control logic unit 30 generates a motor step output to boost one shot 64 which includes a fixed RC timing network consisting of resistor $R_B$ and capacitor $C_B$. The fixed duration timing pulse from boost one shot 64 is coupled through gate 60 to boost control switch 38 which provides a 57 volt boost pulse to the selected stepper motor winding during the initial portion of each motor step.

The duration of this boost voltage pulse for a five hundred character per second printing rate is approximately 1.3 milliseconds. As can be seen from FIG. 5B, this 1.3 millisecond boost voltage is applied during the initial stage of each motor step. After boost one shot 64 has timed out, boost control switch 38 opens and a twenty volt holding voltage remains applied to the selected stepper motor winding.

Motor control logic unit 30 is also responsible for controlling the width of the brake pulse generated by brake one shot 58. As was explained above, the brake pulse is initiated by a brake trigger signal generated by gate 56 which is coupled to character column counter 50. Resistor $R_A$ and capacitor $C_A$ form an RC timing circuit for brake one shot 58. During each step, motor control logic unit 30 causes current to flow through a selected resistor of a resistive weighting network consisting of resistors $R_1$, $R_2$, ..., $R_8$. The value of $R_8$ is greater than the value of $R_1$. The selected resistor of the weighting network together with resistor $R_0$ forms a voltage divider circuit for biasing transistor 66 which provides a flow of current to the RC timing network for brake one shot 58. During the initial 6.0 millisecond step pulse width of the ramp up function illustrated in FIG. 5, the port of motor control logic unit designated by "6.0" goes low and causes current to flow through resistor $R_2$ and its associated diode. Transistor 66 is biased at a predetermined desired level but current is not permitted to flow from the emitter of transistor 66 until brake one shot 58 receives a brake trigger pulse during binary count 100 of character column counter 50. When brake one shot 58 is triggered, the current provided to its timing network from transistor 66 modifies the inherent time constant of the timing circuit to correspond to the desired brake pulse width indicated in FIG. 5D. The minimum brake pulse width for the ramp up function illustrated in FIG. 5 will occur during the seventh step when port 2.0 of motor control logic unit 30 will be activated causing a maximum amount of current to flow through transistor 66 and resulting in the shortest effective time constant for the RC timing circuit of brake one shot 58. Pulse steering circuit 62 causes the braking pulse to be applied to a selected winding of stepper motor 16 in a direction opposite to its direction of rotation. During the seventh step of the ramp up function illustrated in FIG. 5, the boost and holding voltages are applied to phase $\phi1$ for a positive direction of motor rotation, while the brake pulse is applied to phase $\phi3$ during the seventh step in order to decelerate the stepper motor shaft displacement rate. The output of brake one shot 58 is directly coupled to an input of pulse steering circuit 62 in order to directly time the switching of voltage from a motor accelerating winding to the winding selected for application of the braking pulse.

The functions performed by data storage and formatting means 28 and by motor control logic unit 30 are typically performed by microprocessor units such as the Intel 8048. The programming of these microprocessors to accomplish the functions described above is well known to those skilled in the art. The preferred embodiment of the electronic control circuit of the present invention has been used in connection with an electrosensitive, non-impact printer, however it is readily utilized with any type of printer which includes a print head which forms characters from a plurality of columns of dots as the print head is laterally displaced along a print line by a stepper motor. Dual channel encoder 46 described in connection with the preferred embodiment of the invention is commercially available from the Remco Corporation and is designated by their KT model series. The remaining digital logic elements of the present invention are of a design well known to those of ordinary skill in the art. In order to obtain perfect character formation, it is important that the lag signal generated by the dual channel encoder have precisely a 50% duty cycle. Simple circuit adjustments can be performed to obtain this desired goal.

It will be apparent to those skilled in the art that the disclosed electronic control circuit for a high speed printer may be modified in numerous ways and may assume many embodiments other than the preferred forms specifically set out and described above. Accordingly, it is intended by the appended claims to cover all such modifications of the invention which fall within the true spirit and scope of the invention.

We claim:

1. An electronic control circuit for a high speed printer having a character generator coupled to a print head which forms characters as the print head is laterally displaced along a print line by a stepper motor, said control circuit comprising:
   a. encoder means coupled to said stepper motor for generating count up pulses when said stepper motor displaces the print head in a first direction and count down pulses when said stepper motor displaces the print head in a second direction, the count up and count down pulses continuously defining the present print head position;
   b. memory means for receiving electronic signals representative of printable characters during a load cycle and for reading out printable characters to the character generator during a print cycle;
   c. means coupled to said memory means for formatting input data to be printed, loading said memory means with the formatted data, computing a desired print head position during each load cycle and initiating the print cycle at the end of each load cycle;
   d. up/down counter means coupled to said encoder means, said memory means and said character generator for converting the count up and count down pulses into digital address signals for said memory means and said character generator to cause the print head to print selected characters at selected positions along the print line in response to displacements of the print head by said stepper motor; and
   e. motor control means coupled to said data formatting means and to said stepper motor for controllably accelerating the print head during each print cycle as a function of the difference between the desired print head position and the present print head position.

2. The control circuit of claim 1 wherein said up/down counter means includes a character column counter coupled to the character generator for generating a character column address signal.

3. The control circuit of claim 2 wherein said up/down counter means includes a character position counter coupled to said character column counter and to said memory means for generating a character position address signal corresponding to the present position of the print head along the print line.

4. The control circuit of claim 3 wherein said up/down counter means includes a brake trigger circuit coupled to said character column counter and to said motor control means for generating a brake trigger pulse at a selected point during the printing of each character.

5. The control circuit of claim 2 wherein the character position address signal causes said memory means to read out to the character generator the character desired to be printed at the present print head position.

6. The control circuit of claim 5 wherein said character column address signal designates to the character generator the position of the print head which corresponds to the column of the character being read out by said memory means to the character generator.

7. The control circuit of claim 1 wherein said encoder means includes an optical encoder coupled to the shaft of said stepper motor for generating output pulses representative of the magnitude and direction of movement of said shaft.

8. The control circuit of claim 7 wherein said optical encoder includes a dual channel encoder for generating lead and lag output signals.

9. The control circuit of claim 8 wherein said encoder means further includes encoder logic for receiving the lead and lag output signals from said dual channel encoder and for generating count up pulses when the shaft of said stepper motor rotates in a first direction and count down pulses when the shaft of said stepper motor rotates in a second direction.

10. The control circuit of claim 1 wherein said motor control means further includes means for continuously determining the present print head position.

11. The control circuit of claim 10 wherein said data formatting means transmits a desired print head position signal to said motor control means during each load cycle.

12. The control circuit of claim 11 wherein said motor control means includes a motor control logic unit for computing the magnitude and direction of print head displacement between the present print head position and the desired print head position designated by said data formatting means.

13. The control circuit of claim 12 wherein said motor control logic unit includes a memory for storing a plurality of digital ramp up and ramp down functions and wherein said motor control logic unit selects a predetermined ramp up or ramp down function in accordance with the magnitude and direction of the computed print head displacement during each print cycle.

14. The control circuit of claim 13 wherein said motor control means includes brake pulse width control means coupled to said motor control logic unit and to a brake trigger circuit for varying the pulse width of a braking pulse applied to said stepping motor in accordance with the ramp up/ramp down function designated by said motor control logic unit.

15. The control circuit of claim 13 wherein said motor control means includes motor boost control means coupled to said motor control logic unit for applying a high voltage boost pulse for a predetermined fixed time to a selected winding of said stepper motor to increase the rate of displacement of the shaft of said stepper motor.

16. The control circuit of claim 5 wherein said data formatting means generates a data load address signal representative of the desired address of data being loaded into said memory means.

17. The control circuit of claim 16 wherein said memory means includes:
   a. a print RAM for storing data from said data formatting means; and
   b. a multiplexer for selectively routing the data load address signal to said print RAM during the load cycle and the character position address signal to said print RAM during the print cycle.

18. The control circuit of claim 17 wherein said data formatting means further includes a load/print switch coupled to said multiplexer for coupling the input of said multiplexer to said data formatting means during the load cycle and for coupling the input of said multiplexer to said character position counter during the print cycle.

19. The control circuit of claim 13 wherein said motor control means includes pulse steering circuit coupled to said motor control logic unit and to said brake pulse width control means for transmitting a braking pulse to a selected winding of said stepper motor.

20. An electronic control circuit for a high speed printer having a character generator coupled to a print head which forms characters as the print head is laterally displaced along a print line by a stepper motor, said control circuit comprising:
   a. an optical encoder coupled to the shaft of said stepper motor for generating output pulses indicative of the magnitude and direction of movement of said shaft;
   b. encoder logic coupled to the output of said optical encoder for generating count up pulses when the shaft of said stepper motor rotates in a first direction and count down pulses when the shaft of said stepper motor rotates in a second direction, the count up and count down pulse continuously defining the present print head position;
   c. memory means for receiving electronic signals representative of printable characters during a load mode and for reading out printable characters to the character generator during the print cycle;
   d. means coupled to said memory means for formatting input data to be printed, loading said memory means with the formated data, computing a desired print head positioned during each load cycle and initiating the print cycle at the end of each load cycle;
   e. a character column counter coupled to said encoder logic and to said character generator for receiving said count up and count down pulses and for generating a character column address signal;
   f. a character position counter coupled to said character column counter and memory means for generating a character position address signal corresponding to the present position of the print head along the print line; and
   g. motor control means coupled to said data formatting means and to said stepper motor for controllably accelerating the print head during the print cycle as the function of the difference between the desired print head position and the present print head position.

21. The control circuit of claim 20 further including a trigger circuit coupled to said character column counter and to said motor control means for generating a brake trigger pulse at a selected point during the printing of each character.

22. The control circuit of claim 21 wherein said motor control means includes a motor control logic unit for computing the magnitude and direction of print head displacement between the present print head position and the desired print head position designated by the data formatting means.

23. The control circuit of claim 22 wherein said motor control means includes brake pulse width control means coupled to said motor control logic unit and to said brake trigger circuit for varying the pulse width of a braking pulse applied to said stepping motor.

24. The control circuit of claim 23 wherein said motor control means further includes means for continuously determining the present print head position.

25. The control circuit of claim 22 wherein said data formatting means transmits a desired print head position signal to said motor control means during each load cycle.

26. The control circuit of claim 11 wherein said motor control means further includes a motor control logic unit for computing the magnitude and direction of print head displacement between the present print head position and the desired print head position designated by said data formatting means.

27. The control circuit of claim 24 wherein said motor control logic unit includes a memory for storing a plurality of digital ramp up and ramp down functions and wherein said motor control logic unit selects a predetermined ramp up or ramp down function in accordance with the magnitude and direction of the computed print head displacement during each print cycle.

28. The control circuit of claim 25 wherein said motor control means includes brake pulse width control means coupled to said motor control logic and to said brake trigger circuit for varying the pulse width of a braking pulse applied to said stepping motor in accordance with the ramp up/ramp down function designated by said motor control logic.

29. The control circuit according to claim 26 wherein said motor control means includes motor boost control means coupled to said motor control logic unit for applying a high voltage boost pulse for a predetermined fixed time to a selected winding of said stepper motor to increase the rate of displacement of the shaft of said stepper motor.

* * * * *